United States Patent [19]

Shaw-Klein et al.

[11] Patent Number: 5,620,765
[45] Date of Patent: Apr. 15, 1997

[54] AQUEOUS BACKING FOR DIGITAL OPTICAL MEDIA

[75] Inventors: Lori J. Shaw-Klein, Rochester; John B. Murphy, Pittsford, both of N.Y.

[73] Assignee: Eastman Kodak Company, Rochester, N.Y.

[21] Appl. No.: 432,735

[22] Filed: May 2, 1995

[51] Int. Cl.$^6$ ..................................................... B32B 3/00
[52] U.S. Cl. ..................... 428/64.1; 428/64.2; 428/64.3; 428/64.4; 428/64.5; 428/64.7; 428/402; 428/913; 430/270.11; 430/270.12; 430/270.13; 430/445.1; 430/945; 369/283; 369/287; 369/288
[58] Field of Search ..................... 428/64.1, 64.2, 428/64.3, 64.4, 64.7, 402, 913; 430/270.11, 270.12, 270.13, 495.1, 945; 369/283, 287, 288

[56] References Cited

U.S. PATENT DOCUMENTS

| | | | |
|---|---|---|---|
| 4,427,738 | 1/1984 | Fujiyama et al. | 428/323 |
| 4,794,040 | 12/1988 | Ojima et al. | 428/64 |
| 4,906,498 | 3/1990 | Ichikawa et al. | 428/64 |
| 5,230,818 | 7/1993 | James et al. | 252/62.55 |
| 5,298,305 | 3/1994 | Shinozuka et al. | 428/64 |
| 5,382,463 | 1/1995 | Adkins et al. | 369/286 |
| 5,459,019 | 10/1995 | Kato et al. | 430/271 |
| 5,475,673 | 12/1995 | Adkins | 369/286 |
| 5,534,385 | 7/1996 | Spahn | 430/270.13 |

FOREIGN PATENT DOCUMENTS

| | | |
|---|---|---|
| 0545371 | 6/1993 | European Pat. Off. . |
| 0551071 | 7/1993 | European Pat. Off. . |
| 0551072 | 7/1993 | European Pat. Off. . |

*Primary Examiner*—Patrick Ryan
*Assistant Examiner*—Elizabeth Evans
*Attorney, Agent, or Firm*—Alfred P. Lorenzo; Carl F. Ruoff

[57] ABSTRACT

Flexible digital optical media, such as optical tapes, are provided with an aqueous-applied backing layer which provides excellent performance with regard to runnability, scratch resistance, abrasion resistance, frictional properties and curl characteristics. The backing layer comprises a film-forming water-dispersible polymeric binder and water-dispersible static-dissipative filler particles and a water-dispersible lubricant is either incorporated within the backing layer or forms a thin film over the surface of the backing layer.

20 Claims, No Drawings

AQUEOUS BACKING FOR DIGITAL OPTICAL MEDIA

FIELD OF THE INVENTION

This invention relates in general to optical data recording elements and in particular to an improved backing layer for such elements. More specifically, this invention relates to an improved backing layer which is applied from an aqueous formulation and which is especially useful with flexible digital optical media, such as optical tape, in that it provides excellent performance with regard to runnability, scratch resistance, abrasion resistance, frictional properties and curl characteristics.

BACKGROUND OF THE INVENTION

Support materials for magnetic or optical storage media or other types of imaging elements often employ a backing layer containing a hydrophobic polymeric binder, such as a polyurethane, in combination with abrasive fillers, conductive particles such as carbon particles, and lubricants or combinations of lubricants. Such backing layers are used to provide abrasion resistance, low friction and durability as the element is transported through an appropriate drive or reader.

The aforesaid backing layers are typically coated from organic solvent-based solutions to yield a continuous film upon evaporation of the solvent. However, such organic solvent-based solutions are disadvantageous from an environmental standpoint. In addition, organic-solvent based coating formulations induce an undesirable deformation or curl to the support as they are coated, which is especially objectionable when coated on very thin support such as that typically used for optical image recording tape.

In the fields of magnetic and optical media, low friction and hence abrasion resistance are often achieved through the use of ceramic or polymeric matte particles of sufficient size and appropriate shape such that they extend above the surface of the layer in which they are embedded. When such elements are wound in a tape configuration, such matte particles can permanently deform the support with which they come in contact, thereby adversely affecting the quality of the magnetic or optical storage media. When very low error rates are required in digital optical imaging media, a smooth running surface is greatly preferred.

U.S. Pat. No. 5,230,818 to James et al describes a conventional back coating composition for a magnetic support application. The coating composition comprises a polyurethane, abrasive fillers, carbon black, a vinyl copolymer, a cross-linker, coating aids and lubricants and is coated from a solvent mixture such as methylethytketone:methylisobutylketone: cyclohexanone in a 4:3:3 ratio.

U.S. Pat. No. 4,794,040 to Ojima et al describes a magnetic recording back coating layer formed from a coating formulation in which carbon black is added to a solvent/binder composition from an aqueous dispersion and the formulation preferably also contains an aliphatic acid-modified, fluorinated organosilicone lubricant. Acceptable solvents include alcohols, aromatic compounds, ketones and mixtures thereof.

Japanese Patent Publication No. 2218031, published Aug. 30, 1990, describes an optical tape media having an antistatic layer on both surfaces of the tape, one of which layers is a laminated carbon layer.

U.S. Pat. No. 4,906,498, to Ichikawa et al describes an optical recording medium in which the support is an optically isotropic laminate comprised of at least one thermoplastic gas-impermeable synthetic resin film layer and at least one cured crosslinked resin layer.

European Patent Application No. 0 551 071, published Jul. 14, 1993, describes an optical tape in which the recording layer is formed on a substrate surface with a center line average roughness of not more than 0.005 μm and with coarse protuberances having a height of not less than 0.10 μm in a quantity of not more than 10 protuberances/cm$^2$.

European Patent Application No. 0 551 072, published Jul. 14, 1993, describes an optical tape in which the recording layer is formed on a substrate surface with a center-line average roughness of not more than 0.005 μm, in which the substrate comprises a polyethylene-2,6-naphthalate layer and in which the substrate meets specified requirements for tensile strength and Young's modulus.

European Patent Application No. 0 545 371, published Jun. 9, 1993, describes an optical tape comprising a substrate having a center-line average roughness on one side of 0.005 to 0.5 μm and a tensile strength in the longitudinal direction of not less than 8 kg/mm$^2$.

U.S. Pat. No. 4,427,738 to Fujiyama et al describes a magnetic recording medium having a magnetic recording layer on one side of a non-magnetic base and a lubricant layer on the other side characterized in that the lubricant layer has a thickness of 2.5 to 5 μm and a surface roughness of 0.33 to 0.72 μm.

U.S. Pat. No. 5,382,463 to Adkins et al describes an optical recording tape which has a backing layer providing a surface texture designed to impart high static friction between the opposite faces of the tape so as to enable the tape to maintain pack integrity during storage and transport. The means of achieving the desired surface texture is through polymeric protuberances.

The present invention is directed toward the objective of providing an improved backing layer for a flexible optical recording element, such as an optical tape, which provides excellent performance with regard to runnability, scratch resistance, abrasion resistance, frictional properties and curl characteristics. It is a further objective of this invention to provide such improved backing layer without the need to employ matte particles or organic solvents.

SUMMARY OF THE INVENTION

In accordance with this invention, an improved optical recording element is comprised of a flexible support; an optical recording layer on one surface of the support; a backing layer on the opposite surface of the support which comprises a film-forming water-dispersible polymeric binder and water-dispersible static-dissipative filler particles which are of dimensions such that they do not protrude above the surface of the backing layer; and a water-dispersible lubricant within the backing layer or forming a thin film over the surface of the backing layer.

in one embodiment, the present invention pertains to an optical recording element comprised of a flexible support, an optical recording layer and a backing layer as hereinabove described. In another embodiment, the invention pertains to a substrate that is especially adapted for use as a base for an optical recording element, such substrate comprising a flexible support having on one surface thereof a backing layer as hereinabove described.

The backing layer of this invention is prepared from a water-based coating formulation. Such formulations are highly advantageous from an environmental standpoint as compared to organic solvent-based coating formulations. Morever, since, water-based coating formulations do not swell or dissolve the support surface during the the coating operation, they do not impart undesirable deformation or curl to the support.

The backing layer of this invention provides a smooth running surface which is highly advantageous when very low error rates are required in the optical element. The smooth surface eliminates concern over the ability of protuberances to deform an optical tape when it is wound in tension. At the same time, the backing layer of this invention provides excellent frictional properties, good scratch-resistance and good abrasion-resistance.

When it is incorporated in the backing layer, the lubricant is employed in this invention in higher amounts than have been typically employed in the prior art. Some of the lubricant tends to be absorbed by the filler particles so the lubricant must be used in an amount sufficient to allow for this and still provide the desired frictional characteristics.

In a preferred embodiment of the invention, the binder is employed in an amount of from about 0.1 to about 3 $g/m^2$ and more preferably about 0.3 to about 1 $g/m^2$; the filler particles are employed in an amount of from about 0.05 to about 2 $g/m^2$ and more preferably about 0.1 to about 0.8 $g/m^2$; and the lubricant is employed in an amount of from about 0.01 to about 0.8 $g/m^2$ and more preferably about 0.05 to about 0.4 $g/m^2$.

The binder, the filler particles and the lubricant can be blended together in an aqueous medium and coated on the support in the form of a single layer. Alternatively, the binder and filler particles can be blended together in an aqueous medium and coated as a first layer and the lubricant can be coated as a second layer which overlies the first layer.

DETAILED DESCRIPTION OF THE INVENTION

Suitable supports for use in this invention include polyethylene terephthalate, polyethylene naphthalate, poly-1,4-cyclohexanedimethylene terephthalate, polyvinyl chloride, polyimide, polycarbonate, polystyrene, cellulose acetate, cellulose acetate propionate, cellulose acetate butyrate, and the like. To promote adhesion, the supports can be surface treated by various processes including corona discharge, glow discharge, UV exposure or solvent washing or can be overcoated with polymers such as vinylidene chloride containing copolymers, butadiene-based copolymers, glycidyl acrylate or methacrylate containing copolymers or maleic anhydride containing copolymers.

The support thickness is typically in the range of from about 0.004 to about 0.2 millimeters and more preferably about 0.01 to about 0.025 millimeters.

A wide variety of optical recording layers are well known in the art and any of the known layers can be utilized in this invention. Some of the known elements have utilized dye layers to absorb light, with deformation or ablation of one or a sandwich of layers being the mechanism for changing the reflectance or transmittance to effect digital information storage. Others have utilized the deformation of metal or alloy layers or the flow of low melting point metals or alloys upon the absorption of optical energy. Still others rely on the rotation of the polarization of light from areas of a special alloy layer heated and cooled in the presence of appropriate magnetic fields (maqnetooptic recording); or the change in phase of a metal or alloy from amorphous to crystalline or between crystalline phases upon local heating accompanied by a detectable change in the reflectance (or transmittance) from (or through) the areas of differing crystal phases.

One particularly advantageous optical recording material is the phase-change optical recording SbInSn alloy described in commonly assigned U.S. Pat. No. 4,904,577, 4,960,680 and 5,271,978. This material is characterized by having good writing sensitivity, good signal-to-noise ratio, wide wavelength response and good resolution. It has also been found to be compatible with coating on a flexible support needed for flexible digital optical tape.

As hereinabove described, an essential component of the backing layer of this invention is a film-forming water-dispersible polymeric binder. Useful binders are polymers which give a uniform continuous film when an aqueous coating formulation is applied to the support and dried under conditions typical of web or spin coating operations, for example, drying at elevated temperatures such as 100° C.

Examples of film-forming water-dispersible polymeric binders that are especially useful in this invention include addition-type polymers and interpolymers prepared from ethylenically-unsaturated monomers such as acrylates including acrylic acid methacrylates including methacrylic acid, acrylamides and methacrylamides, itaconic acid and its half esters and diesters, styrenes including substituted styrenes, acrylonitrile and methacrylonitrile, vinyl acetates, vinyl ethers, vinyl and vinylidene halides, and olefins. Other suitable polymers useful as the binder are film-forming dispersions of polyurethanes, polyesterionomers, or biomolecules such as gelatin or casein.

A second essential component of the backing layer of this invention is a water-dispersible static-dissipative filler particle. These particles provide resistance to static electrical charge build-up, scratches, abrasion and blocking. The filler particles preferably exhibit sufficient conductivity that when they form a contiguous network within the otherwise insulating binder component they provide a surface resistivity of not more than $10^{12}$ ohms/square.

Examples of water-dispersible static-dissipative filler particles that are especially useful in this invention include carbon black and water-dispersible ceramics such as silica, alumina and tin oxide.

As hereinabove described, the filler particles utilized in this invention are of dimensions such that they do not protrude above the surface of the backing layer since protruding particles can deform the optical recording layer when an optical tape is wound in roll form. Preferably the filler particles have a maximum dimension in the range of from about 5 nanometers to about 1 micrometer.

The word "particles", as used herein, is intended to encompass any shape whatsoever as the particular shape of the filler particles is not critical. It is, however, preferred that the filler particles be generally rounded in shape.

As hereinabove described, in the optical recording elements of this invention a water-dispersible lubricant is either incorporated within the backing layer or utilized as a thin layer over the surface of the backing layer.

Useful lubricants include aqueous dispersions or emulsions of any of a wide variety of lubricious materials known in the art. Examples include synthetic or natural waxes; fatty acids or derivatives of fatty acids; resins prepared from ethylene or propylene or copolymers thereof; stearates; amides; glycols and the like, either singly or in combination.

The binder phase, filler phase and lubricant phase can be used in a wide range of proportions. For example, the binder phase can about comprise about 10 to about 90 weight percent of the backing layer, the filler phase can comprise about 5 to about 80 weight percent of the backing layer, and the lubricant phase can comprise about 1 to about 50 weight percent of the backing layer.

The backing layer is suitably applied from an aqueous coating formulation containing up to about 50% total solids by well-known coating methods such as, for example, bead coating, gravure coating, skim pan/air knife coating, or spray coating. The coating can be dried at temperatures up to about 150° C. to give dry coating weights of 0.1 $g/m^2$ to 10 $g/m^2$.

In addition to the binder, filler and lubricant, the coating composition can include surfactants, emulsifiers, coating aids, matte particles, crosslinking agents, adhesion promoters, pigments, and biocides. The coating composition can also include small amounts of organic solvents, but preferably the concentration of organic solvent is less than 2 weight % of the total coating composition.

As previously described herein, the invention pertains in one aspect thereof to an improved flexible optical recording element, most commonly in the form of a tape, comprised of a flexible support having an optical recording layer on one surface thereof and a backing layer as herein described on the opposite surface. The element can also include an overcoat layer overlying the optical recording layer to provide such advantageous features as scratch resistance and corrosion resistance. Suitable overcoats are described, for example, in copending commmonly assigned U.S. patent application Ser. No. 08/416,105, entitled "Overcoat For Optical Tape Having SbInSn Recording Layer" by Robert G. Spahn, filed Apr. 4, 1995, now U.S. Pat. No. 5,534,385, issued Jul. 9, 1996.

The invention is further illustrated by the following examples of its practice.

Specific materials utilized in carrying out the examples were as follows:

(A) a polyester polyurethane (WITCOBOND® 232 from Witco Corporation), (B) a polycarbonate polyurethane (STAHL UE-222 from Stahl Corporation), (C) an acrylonitrile-butadiene-styrene resin (HYCAR® 1578 from B. F. Goodrich Corporation), (D) an acrylonitrile-vinylidene chloride-acrylic acid copolymer, (E) polyvinyl pyrrolidone polymer with a molecular weight of 40,000 from Scientific Products, Inc., (F) polyvinyl butyral (BUTVAR® BR from Monsanto Corporation), (G) aziridine crosslinker (XAMA-7 from Hoechst Celanese Corporation), (H) carbon black (AQUABLAK® 116 B from Borden Corporation), (I) tin oxide (available from Keeling and Walker Corporation)

(J) colloidal silica (LUDOX® SM from DuPont Corporation), (K) carnauba wax (Michelman ML 160 wax from Michelman Corporation), (L) polyolefin resin (Michelman ML 181), (M) PETS wax (Michelman ML 74540), (N) paraffin emulsion (Michelman ML 723), (O) microwax (Michelman ML 124).

In the examples, the elements were evaluated for runnability and abrasion resistance using a rotating drum friction test (RDFT) which is a combination of a friction/stiction and measure-of-durability test.

The rotating drum friction tester, Model RDFT-1A, is supplied by Steinberg Associates, Portola Valley, California. The unit consists of a 10.16 cm diameter motor-driven stainless steel drum with a surface finish Ra of 0.2 microns, A linear spring-loaded displacement transducer is positioned with its center line coincident with a vertical line tangential with one side of the drum surface. A 30 cm long, 1.25 cm wide sample is affixed at one end to the transducer and wrapped around the drum for 180 degrees of contact. A calibrated load is attached to the free end of the sample. The transducer is calibrated in terms of grams of net tangential force against the sample The testing conditions are as follows:

Drum speed: 30 cm/sec

Tangential load: 50 grams

Ambient temperature: 21 ±1 degrees Celsius

Ambient relative humidity: 50% ±5%

Sample equilibration: 24 hours minimum

Test time: 10 minutes, or surface failure (whichever occurs first)

Test output is an oscillograph trace of friction/stiction value vs. time. Two values are recorded; initial friction, $\mu i$, and dynamic friction, $\mu f$. The trace is rated using a two number system. The first number denotes apparent surface modification on a scale of 0 to 5 with 5 being the best. A second number rates the stick/slip, running value, and trace slope characteristics on a scale of 0 to 10 with 10 being the best. The following defines these scales:

| | Description |
|---|---|
| Damage Score | |
| 5 | No visible surface modification |
| 4 | Light scratching or burnish |
| 3 | Moderate to heavy scratching, no debris |
| 2 | Moderate to heavy scratching, light debris |
| 1 | Moderate to heavy scratching, moderate to heavy debris |
| 0 | Adhesive failure (removal) of coating |
| Performance Score | |
| 10 | Flat trace, no stick/slip, $\mu i = 0.1$–$0.3$, $\mu f >$ or $= 0.06$ |
| 9 | Light, uniform stick/slip, 0 or negative slope |
| 8 | Moderate, uniform stick/slip, 0 or negative slope |
| 7 | Heavy, uniform stick/slip, 0 or negative slope |
| 6 | Light, variable stick/slip, 0 or negative slope |
| 5 | Moderate, variable stick/slip, 0 or negative slope |
| 4 | Heavy, variable stick/slip, 0 or negative slope |
| 3 | Light, variable stick/slip, positive slope at any place on the trace |
| 2 | Moderate, variable stick/slip, positive slope at any place on the trace |
| 1 | Heavy, variable stick/slip, positive slope at any place on the trace |
| 0 | Failure, $\mu f > 0.76$, or significant surface damage with debris. |

In addition to RDFT, kinetic coefficients of friction were approximated by converting the angle of inclination of the coating surface in question which was required to propel a metal clip across it in a smooth fashion.

For selected examples, surface resistivity was measured directly by either a Trek Model 150 (Trek Inc., Medina, N.Y., USA) according to ASTM standard D257-78, or in some cases with a combination Hewlett-Packard model 16008A resistivity cell in combination with a Hewlett-Packard model 4329A high resistance meter.

EXAMPLES 1–23

Aqueous coating compositions comprising 7.5 weight percent total solids were applied to a subbed polyethylene terephthalate film support and dried at approximately 100° C. for about a minute to give a coating with a dry coating weight of 1 g/m². The identity and amount, in weight % of total solids, of the binder, filler and lubricant employed in each of the aqueous coating compositions for examples 1 to 23 is summarized in Table I below. Also included in Table I are the coating compositions for controls 1 and 2 which employed no filler.

TABLE I

| Example No. | Binder | Wt. % Binder | Filler | Wt. % Filler | Lubricant | Wt. % Lubricant |
|---|---|---|---|---|---|---|
| Control 1 | A | 99.3 | — | — | K | 0.7 |
| Control 2 | A | 98.9 | — | — | K | 1.1 |
| 1 | A | 69.3 | H | 29.9 | K | 0.8 |
| 2 | B | 53.6 | H | 23.1 | K | 23.3 |
| 3 | A/D | 42.5/11.1 | H | 23.1 | K | 23.3 |
| 4 | A + G/D | 42.5/11.1 | H | 23.1 | K | 23.3 |
| 5 | A | 54 | H | 23 | K | 23 |
| 6 | C | 54 | H | 23 | K | 23 |
| 7 | D | 54 | H | 23 | K | 23 |
| 8 | E | 54 | H | 23 | K | 23 |
| 9 | F | 54 | H | 23 | K | 23 |
| 10 | A | 57 | H | 23 | L | 20 |
| 11 | A | 57 | H | 23 | M | 20 |
| 12 | A | 57 | H | 23 | N | 20 |
| 13 | A | 57 | H | 23 | O | 20 |
| 14 | A | 15 | I | 65 | K | 20 |
| 15 | A | 15 | J | 65 | K | 20 |
| 16 | A | 15 | I/J | 32.5/32.5 | K | 20 |
| 17 | A | 30 | I/J | 32.5/32.5 | K | 5 |
| 18 | A | 72 | H | 5 | K | 23 |
| 19 | A | 47 | H | 30 | K | 23 |
| 20 | A | 27 | H | 50 | K | 23 |
| 21 | A | 72 | H | 23 | K | 5 |
| 22 | A | 47 | H | 23 | K | 30 |
| 23 | A | 27 | H | 23 | K | 50 |

For each of Examples 1 to 23, tests were carried out to determine the coefficient of friction and both the RDFT damage rating and the RDFT performance rating. For selected examples, surface resistivity in ohms/square was also measured. The results obtained are summarized in Table II. Also included in Table II, for purposes of comparison, are Control 1, Control 2, Control 3 in which the element was bare polyethylene terephthalate film and Control 4 in which the element was 3 M magnetic tape, Type 5198.

TABLE II

| Example No. | Coefficient of Friction | RDFT Damage Rating | RDFT Performance Rating | Surface Resistivity (ohms/square) |
|---|---|---|---|---|
| Control 1 | 0.28 | 0 | 0 | $>4 \times 10^{16}$ |
| Control 2 | 0.27 | 0 | 0 | $>4 \times 10^{16}$ |
| Control 3 | 0.35 | 5 | 2 | — |
| Control 4 | — | 5 | 10 | — |
| 1 | 0.50 | 5 | 6 | — |
| 2 | 0.20 | 3.7 | 8 | — |
| 3 | 0.23 | 5 | 8.7 | — |
| 4 | 0.22 | 5 | 10 | — |
| 5 | 0.20 | 5 | 9.3 | $2 \times 10^8$ |
| 6 | 0.36 | 5 | 9 | $1 \times 10^6$ |
| 7 | 0.22 | 5 | 10 | $6.3 \times 10^5$ |
| 8 | 0.24 | 3 | 0.5 | $1.6 \times 10^6$ |
| 9 | 0.51 | 4.5 | 0.5 | $1 \times 10^{10}$ |
| 10 | 0.25 | 5 | 9.7 | — |
| 11 | 0.22 | 5 | 9 | — |
| 12 | 0.25 | 5 | 9.3 | — |
| 13 | 0.15 | 5 | 9.7 | — |
| 14 | 0.30 | 4 | 9 | $1.1 \times 10^9$ |
| 15 | 0.45 | 5 | 6 | $1.5 \times 10^{11}$ |
| 16 | 0.55 | 5 | 9 | $8.4 \times 10^{10}$ |
| 17 | 0.55 | 2.7 | 1.3 | $1.1 \times 10^{11}$ |
| 18 | 0.18 | 5 | 3 | $1.2 \times 10^{15}$ |
| 19 | 0.22 | 5 | 8 | $5 \times 10^5$ |
| 20 | 0.32 | 5 | 7 | $6.3 \times 10^3$ |
| 21 | 0.30 | 5 | 9.7 | — |
| 22 | 0.20 | 5 | 9.7 | $1 \times 10^7$ |
| 23 | 0.18 | 5 | 9.3 | — |

As shown by the data in Table II, Controls 1 and 2, which did not contain filler particles, gave the lowest ratings in both the RDFT damage test and the RDFT performance test. Control 3, which was a bare poly(ethylene terephthalate) film rated highly in the damage test but poorly in the performance test. Control 4, which was a commercially available magnetic tape, gave the highest ratings in both categories. Examples 1–23 illustrate the effects of varying the type and content of binder, the type and content of filler and the type and content of lubricant.

EXAMPLE 24

An aqueous coating composition comprising 7.5 weight percent total solids was applied to a subbed polyethylene terephthalate film support and dried at approximately 100° C. for about a minute to give a coating with a dry coating weight of 1 g/m². The binder was an 80/20 mixture of components A (a polyester polyurethane) and E (an acrylonitrile-vinylidene chloride-acrylic acid terpolymer), the filler was component I (carbon black) and the lubricant was component L (carnauba wax). To evaluate the smoothness of the coated surface, surface profilometry was performed using a Wyko Topco 2D Optical Profilometer. The following values were obtained, with each representing an average of ten measurements and the standard deviation being specified in the parenthesis:

Root mean square roughness—21.1 nm (11.1)

Roughness average—12.5 nm (5.2)

Surface peak-to-valley dimension—186.5 nm (97.7)

EXAMPLE 25

This example was the same as Example 24 except that the binder consisted only of component E. Surface roughness values obtained were as follows:

Root mean square roughness—14.1 nm (5.4)

Roughness average—8.2 nm (2.2)

Surface peak-to-valley dimension—157.9 nm (8.1.2)

The aqueous formulations utilized in preparing the backing layers of this invention are highly advantageous. These formulations provide the superior transport properties generally associated with conventional organic solvent-coated formulations yet are free from the environmental concerns and problems of support curl associated with the use of organic-solvent-coated formulations. These aqueous formulations form smooth continuous coatings which can be held in contact with data storage media without distortion thereof. Accordingly, data bit error rates are minimized.

The invention has been described in detail, with particular reference to certain preferred embodiments thereof, but it should be understood that variations and modifications can be effected within the spirit and scope of the invention.

We claim:

1. A substrate which is especially adapted for use as a base for an optical recording element; said substrate comprising a flexible support having a backing layer on one surface thereof, said backing layer comprising a film-forming water-dispersible polymeric binder and water-dispersible static-dissipative filler particles which are of dimensions such that they do not protrude above the surface of said backing layer; and a water-dispersible lubricant within said backing layer or forming a thin film over the surface of said backing layer.

2. A substrate as claimed in claim 1, wherein the amount of said binder is from about 0.1 to about 3 g/m$^2$, the amount of said filler particles is from about 0.05 to about 2 g/m$^2$, and the amount of said lubricant is from about 0.01 to about 0.8 g/m$^2$.

3. A substrate as claimed in claim 1, wherein the amount of said binder is from about 0.3 to about 1 g/m$^2$, the amount of said filler particles is from about 0.1 to about 0.8 g/m$^2$, and the amount of said lubricant is from about 0.05 to about 0.4 g/m$^2$.

4. A substrate as claimed in claim 1, wherein said flexible support is a polyethylene terephthalate film.

5. A substrate as claimed in claim 1, wherein said flexible support has a thickness in the range of from about 0.01 to about 0.025 millimeters.

6. A substrate as claimed in claim 1, wherein said binder is a polyurethane resin, an acrylonitrile-butadiene-styrene resin, an acrylonitrile-vinylidene chloride-acrylic acid resin, a polyvinyl pyrrolidone or a polyvinyl butyral.

7. A substrate as claimed in claim 1, wherein said filler particles are carbon black, tin oxide or silica particles.

8. A substrate as claimed in claim 1, wherein said lubricant is a synthetic or natural wax.

9. A substrate as claimed in claim 1, wherein said lubricant is carnauba wax.

10. A substrate as claimed in claim 1, wherein said filler particles have a maximum dimension in the range of from about 5 nanometers to about 1 micrometer.

11. An optical recording element comprising a flexible support; an optical recording layer on one surface of said support; a backing layer on the opposite surface of said support, said backing layer comprising a film-forming water-dispersible polymeric binder and water-dispersible static-dissipative filler particles which are of dimensions such that they do not protrude above the surface of said backing layer; and a water-dispersible lubricant within said backing layer or forming a thin film over the surface of said backing layer.

12. An optical recording element as claimed in claim 11, wherein the amount of said binder is from about 0.1 to about 3 g/m$^2$, the amount of said filler particles is from about 0.05 to about 2 g/m$^2$, and the amount of said lubricant is from about 0.01 to about 0.8 g/m$^2$.

13. An optical recording element as claimed in claim 11, wherein the amount of said binder is from about 0.3 to about 1 g/m$^2$, the amount of said filler particles is from about 0.1 to about 0.8 g/m$^2$, and the amount of said lubricant is from about 0.05 to about 0.4 g/m$^2$.

14. An optical recording element as claimed in claim 11, wherein said flexible support is a polyethylene terephthalate film.

15. An optical recording element as claimed in claim 11, wherein said flexible support has a thickness in the range of from about 0.01 to about 0.025 millimeters.

16. An optical recording element as claimed in claim 11, wherein said binder is a polyurethane resin, an acrylonitrile-butadiene-styrene resin, an acrylonitrile-vinylidene chloride-acrylic acid resin, a polyvinyl pyrrolidone or a polyvinyl butyral.

17. An optical recording element as claimed in claim 11, wherein said filler particles are carbon black, tin oxide or silica particles.

18. An optical recording element as claimed in claim 11, wherein said lubricant is a synthetic or natural wax.

19. An optical recording element as claimed in claim 11, wherein said lubricant is carnauba wax.

20. An optical recording element as claimed in claim 11, wherein said filler particles have a maximum dimension in the range of from about 5 nanometers to about 1 micrometer.

\* \* \* \* \*